United States Patent
Kolenko

(10) Patent No.: US 12,480,720 B2
(45) Date of Patent: Nov. 25, 2025

(54) FLUE GAS ENERGY RECOVERY SYSTEM AND METHOD

(71) Applicant: Carbon Cap Inc., Hamilton (CA)

(72) Inventor: Raphael Kolenko, Hamilton (CA)

(73) Assignee: Carbon Cap Inc., Hamilton (CA)

( * ) Notice: Subject to any disclaimer, the term of this patent is extended or adjusted under 35 U.S.C. 154(b) by 412 days.

(21) Appl. No.: 16/492,579

(22) PCT Filed: Mar. 7, 2018

(86) PCT No.: PCT/IB2018/000314
§ 371 (c)(1),
(2) Date: Sep. 9, 2019

(87) PCT Pub. No.: WO2018/162983
PCT Pub. Date: Sep. 13, 2018

(65) Prior Publication Data
US 2020/0049426 A1    Feb. 13, 2020

Related U.S. Application Data

(60) Provisional application No. 62/468,338, filed on Mar. 7, 2017.

(51) Int. Cl.
| | | |
|---|---|---|
| F28D 21/00 | (2006.01) | |
| F24D 3/08 | (2006.01) | |
| F24D 12/02 | (2006.01) | |
| F24H 6/00 | (2022.01) | |
| F24H 8/00 | (2022.01) | |

(52) U.S. Cl.
CPC .......... *F28D 21/0007* (2013.01); *F24D 3/08* (2013.01); *F24D 12/02* (2013.01); *F24H 6/00* (2013.01); *F24H 8/006* (2013.01); *F28D 21/0008* (2013.01); *F24D 2200/18* (2013.01)

(58) Field of Classification Search
CPC ......... F24H 8/006; F24H 9/0084; F24D 12/02
USPC .......................................... 122/20 B; 165/76
See application file for complete search history.

(56) References Cited

U.S. PATENT DOCUMENTS

| | | | | |
|---|---|---|---|---|
| 4,031,862 A | * | 6/1977 | Smith | F28F 21/006 122/DIG. 13 |
| 4,241,869 A | * | 12/1980 | Cratin, Jr. | F23N 5/02 122/479.1 |

(Continued)

*Primary Examiner* — Steven B McAllister
*Assistant Examiner* — John E Bargero
(74) *Attorney, Agent, or Firm* — Jonathan M. D'Silva; MMI Intellectual Property

(57) ABSTRACT

A heat recovery system for recovering waste heat from exhaust gases that are expelled through a flue that are generated as a byproduct from a heating system, comprises a venting arrangement that connects to the flue from the heating system and a motorized damper to direct the exhaust gases from the flue through the venting arrangement to an intake plenum. The intake plenum directs the exhaust gases to a heat exchanger that comprising a series of serpentine conduits between which the exhaust gases pass through. The heat exchanger is connected to exhaust plenum which is in turn connected to an exhaust fan that draws the exhaust gasses through the heat recovery system. The heat exchanger further comprises a series of inlet ports and outlet ports that add and remove coolant to the serpentine conduits at selected temperatures.

31 Claims, 2 Drawing Sheets

(56) References Cited

U.S. PATENT DOCUMENTS

| | | | | |
|---|---|---|---|---|
| 4,401,261 A * | 8/1983 | Brown | ............... | F28D 21/0007 |
| | | | | 237/19 |
| 4,512,288 A * | 4/1985 | Michaud | ............ | F28D 21/0007 |
| | | | | 237/19 |
| 4,681,744 A * | 7/1987 | Weitman | ................. | F23J 15/06 |
| | | | | 261/153 |
| 6,283,067 B1 * | 9/2001 | Akkala | ................... | F24D 12/02 |
| | | | | 122/20 R |
| 6,672,255 B1 * | 1/2004 | Zayas | ..................... | F22B 13/00 |
| | | | | 122/20 B |
| 7,275,533 B2 * | 10/2007 | Soeholm | ................... | F23N 5/18 |
| | | | | 454/238 |
| 2011/0180248 A1 * | 7/2011 | Yoshida | ................. | F28F 19/04 |
| | | | | 165/185 |
| 2011/0203569 A1 * | 8/2011 | Weimer | ................. | F23N 3/045 |
| | | | | 126/285 B |
| 2014/0209697 A1 * | 7/2014 | Kaiser | .................... | F24H 3/065 |
| | | | | 237/55 |
| 2015/0059732 A1 * | 3/2015 | Qia | ...................... | F24H 9/2035 |
| | | | | 126/350.1 |
| 2015/0107537 A1 * | 4/2015 | Liu | .......................... | F22D 1/08 |
| | | | | 122/20 B |
| 2016/0018113 A1 * | 1/2016 | Hagensen | ............... | F23J 15/06 |
| | | | | 122/20 B |
| 2017/0298866 A1 * | 10/2017 | Goricanec | ........... | F24D 19/1039 |
| 2018/0073748 A1 * | 3/2018 | Gagne | ....................... | F24H 1/52 |

* cited by examiner

FLUE GAS ENERGY RECOVERY SYSTEM AND METHOD

BACKGROUND

Many residential mid- to high-rise, multi-unit apartment buildings and commercial and industrial facilities have water and air heating systems and air cooling systems in a variety of configurations that incorporate a variety of technologies to operate. One commonality with most of these systems is the presence of heated exhaust gases that are generated and vented from these systems. These heated exhaust gases represent wasted energy that is not captured by the system and are most often expelled into the atmosphere.

What is presented is a modular, highly configurable energy recovery system and method designed for such systems. Specifically, the heat energy from these exhaust gases is recovered and used to preheat, among other things, air entering the building, domestic hot water, heating rods, and return feed water lines. Cooler line temperatures are also used to pre-cool intake air which reduces the need for air conditioning. The system presented helps increase efficiency from 10-30%, depending on the building's heating, ventilation, and air conditioning ("HVAC") layout, boiler age, available capacity, and other factors. This helps lower $CO_2$ emissions and reduces fuel, electricity, and water consumption.

SUMMARY

What is presented is a heat recovery system for recovering waste heat from exhaust gases that are expelled through a flue that are generated as a byproduct from a heating system. The heat recovery system comprises a venting arrangement that connects to the flue from the heating system. A motorized damper directs the exhaust gases from the flue through the venting arrangement to an intake plenum. The intake plenum directs the exhaust gases to a heat exchanger that comprising a series of serpentine conduits between which the exhaust gases pass through. The heat exchanger is connected to an exhaust plenum which is in turn connected to an exhaust fan that draws the exhaust gasses through the heat recovery system. The exhaust fan is preferred to be a variable speed fan. The heat exchanger further comprises a series of inlet ports and outlet ports. The inlet ports are located to add coolant to the serpentine conduit at selected temperatures and the outlet ports are located to remove coolant from the serpentine conduit at selected temperatures. A temperature sensor is located at each inlet port and each outlet port.

The heat recovery system further comprises a PLC that controls the velocity of the exhaust fan. In some embodiments, the heat recovery system further comprises a series of motorized valves to control coolant flowrate through the inlet ports and the outlet ports thereby controlling coolant flowrate through the serpentine conduits. In some embodiments, a PLC controls the motorized valves. In some embodiments, the outlet ports return heated coolant to the heating system for reheating, distribution, or storage. The coolant to and from the inlet ports and/or the outlet ports may be used to preheat or precool air in air conditioning and ventilation systems and/or water in water heating systems. The coolant to one of the inlet ports could comprise domestic cold water, or outdoor ambient air for heating or cooling as needed.

In some embodiments, elements of said heat exchanger that are subject to corrosion are coated with a thermally conductive corrosion resistant coating. The serpentine conduits may comprise one of fin tube type heat exchangers, plate heat exchangers, condenser heat exchangers, or a combination thereof.

In some embodiments of the heat recovery system, a modulating pressure controller may be used to monitor and regulate draft and pressure within the exhaust fan and the motorized dampers. A condensate collection system may also be incorporated to capture condensate created within the heat recovery system for recycling or removal. A flue gas analyzer could be used to measure the physical characteristics and content of the exhaust gases entering and/or leaving the heat recovery system.

In another embodiment of heat recovery system is presented for recovering waste heat from exhaust gases that are expelled through an exhaust flue that are generated as a byproduct from a heating system for preheating intake gases in an intake flue to the heating system. This heat recovery system comprises a first heat exchanger located in the exhaust flue and a second heat exchanger located in the intake flue. The first heat exchanger and the second heat exchanger connected to each other and have a coolant within them. A pump propels the coolant from the first heat exchanger to the second heat exchanger such that the coolant is heated in the exhaust flue and cooled in the intake flue to recover heat in the exhaust gases and preheat the intake gases.

In some embodiments, elements of the heat recovery system that are subject to corrosion are coated with a thermally conductive corrosion resistant coating. A condensate collection system may be incorporated to capture condensate created within the heat recovery system for recycling or removal.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
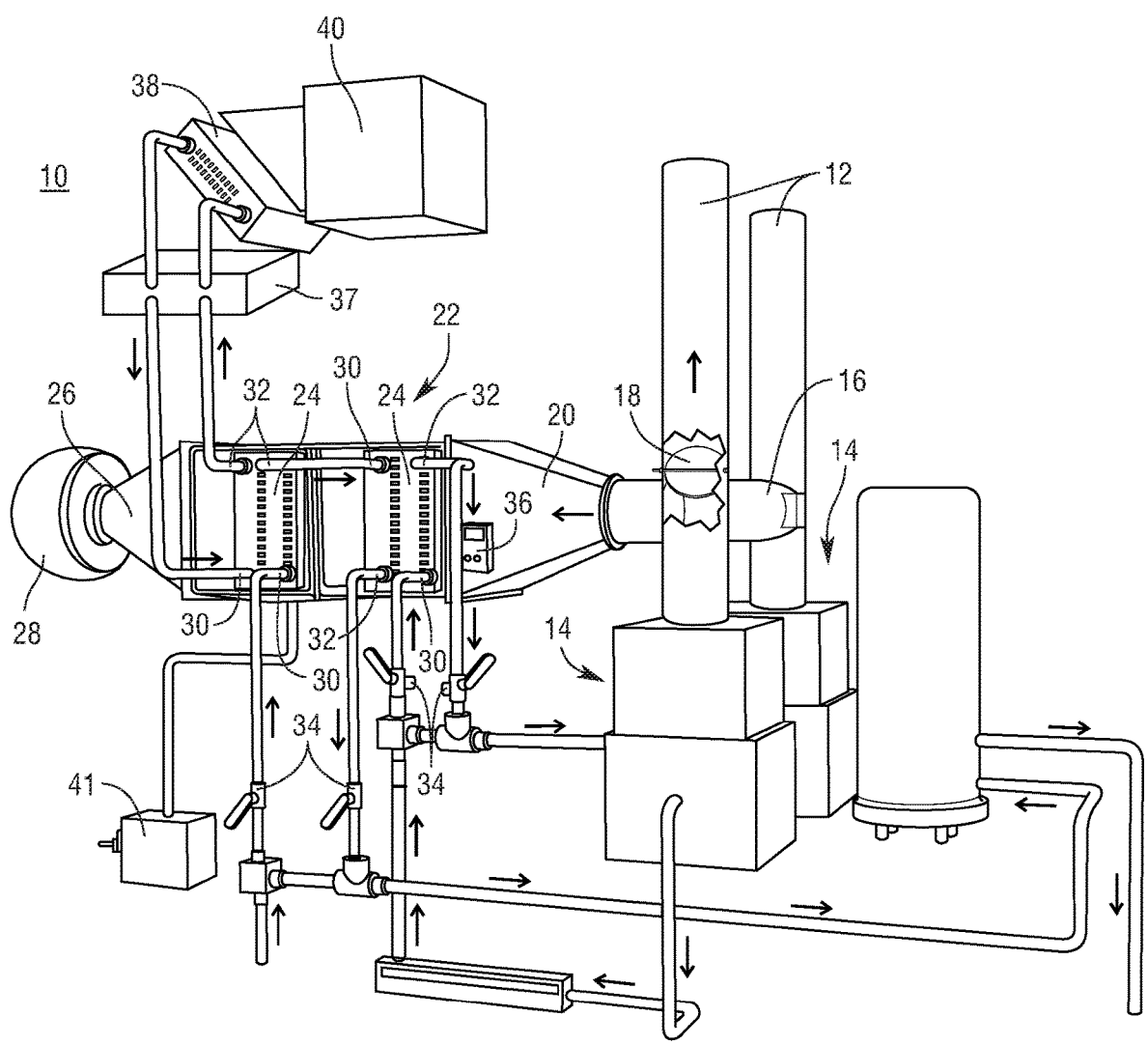
FIG. 1 shows a schematic of a flue gas energy recovery system connected to heater system.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

With the increasing awareness that energy consumption, and therefore cost, can be mitigated by increasing the efficiency of commercial and residential appliances, the heated exhausts vents of many residential mid- to high-rise, multi-unit apartment buildings and commercial and industrial facilities present an opportunity for realizing significant efficiencies in fuel consumption and cost savings. Water and air heating systems and air cooling systems in a variety of configurations that incorporate a variety of technologies to operate all have heated exhaust gases that are generated and vented from these systems. These heated exhaust gases are most often expelled into the atmosphere through flues or chimneys.

The modular, highly configurable energy recovery system and method presented herein has been developed for such systems. Specifically, the heat energy from these exhaust gases is recovered and used to preheat, among other things, air entering the building, domestic hot water, heating rods, and return feed water lines. Cooler line temperatures are also used to pre-cool intake air which reduces the need for air conditioning. The system presented helps increase efficiency from 10-30%, depending on the building's heating, ventilation, and air conditioning ("HVAC") layout, boiler age, and available capacity. This helps lower $CO_2$ emissions and reduces fuel, electricity, and water consumption.

The purpose of the heat recovery system is to increase a building's overall energy efficiency. This is accomplished by lowering natural gas and water consumption primarily by capturing heat energy within the building's boilers' exhaust flue, providing humidified air to ventilation system, reusing collected water from condensate and, when present, capturing heat energy from the building's rooftop AC compressors. The captured heat energy can be used in the main areas: 1) Pre-heating domestic hot water supply; 2) Supplying additional heat to air handlers which provide forced make-up air for ventilation systems; and 3) Pre-heating the buildings' radiant heater return line before it enters the boiler.

FIG. 1 shows a schematic of a heat recovery system 10 for recovering waste heat from exhaust gases that are expelled through a flue 12 that are generated as a byproduct from a heating system 14, such as the boilers shown in the figure, but it will be understood that any other system that has requires venting to exhaust heated gases could be modified to accommodate such a heat recovery system 10. A venting arrangement 16 connects to the flue 12 from the heating system. A motorized damper 18 is installed in the flue 12 to direct the exhaust gases from the flue 12 to the heat recovery system 10. Although only one is shown in the figure, each flue 12 has its own motorized damper 18. Additional motorized dampers 18 may be located at other positions within the flues and/or the venting arrangement 16 as necessary to ensure that the exhaust gases from the heating systems are captured and sent to the heat recovery system 10. When the heat recovery system is activated, the particular combination of motorized dampers 18 needed to direct the exhaust gases to the heat recovery system 10 are actuated.

In the embodiment depicted, the heating system 14 comprises two heating units with separate flue 12 systems. The venting arrangement 16 is configured to capture the exhaust gasses from any number of heating systems 14 that heat recovery system 10 may be connected to. The size and scale of the heating recover system 10 is based on the size, scale, and number of heating systems 14 to which it is attached.

Every building has different heating system 14 flue layouts with vertical or horizontal exhaust sections. Many heating system rooms also have flue layouts that are less than perfect. This means the heating systems 10 could be under preforming. An assessment will need to be performed at each building location to determine if an economical venting arrangement could be created for high use boilers. If feasible, additional engineering will be needed to determine what mechanical vent and exhaust system will be needed to insure the boilers can adequately function with the heat recovery system 10 in operation. Building, mechanical, and other local government and regulatory codes will need to be closely followed. Those of skill in the art can easily determine venting arrangements for multiple flues 12 from multiple heating systems 14 like that shown in the figure with the aim to divert exhaust gases to the heat recovery system 10.

The motorized dampers 18 direct the exhaust gases from the flue 12 through the venting arrangement 16 to an intake plenum 20. The intake plenum 22 directs the exhaust gases to a heat exchanger 22 that comprises a series of serpentine conduits 24 between which the exhaust gases pass through. The heat exchanger 22 is connected to an exhaust plenum 26 which is in turn connected to an exhaust fan 28 that draws the exhaust gasses through the heat recovery system 10.

The heat exchanger 10 incorporates series of inlet ports 30 and outlet ports 32. The inlet ports 30 are located to add coolant to the serpentine conduits 24 at selected temperatures. The outlet ports 32 are located to remove coolant from the serpentine conduits 24 at selected temperatures. A temperature sensor (not shown) is incorporated at each inlet port 30 and each outlet port 32. A series of motorized valves 34 control the coolant flowrate through the inlet ports 30 and outlet ports 32 thereby controlling coolant flowrate through the serpentine conduits 24.

Additional sensors, gauges, and controls that are not shown may be incorporated to monitor various aspects of the heat recovery system 10 including a BTU meter, variable speed fans and pumps, valves, dampers, and other devices to control the flow of gases and coolants and control the operation of various aspects of the heat recovery system 10.

An integrated BTU meter would monitor energy savings in real-time. A pressure sensor allows the exhaust fan 28 to balance the rate at which the exhaust gasses are drawn from the heating system 14, making the heat recovery system 10 essentially invisible to the existing heating system 14 operation.

The heat recovery system 10 will preferably include a flue gas analyzer to measure the physical characteristics and content of the exhaust gases entering and/or leaving the heat recovery system 10. This could perform instant analysis of the exhaust gasses and general function analysis of the operation of the heating system 14. This information will help dictate the operation of the heat recovery system's 10 motorized dampers 18, exhaust fan 28, valve, pump controls, etc. The flue gas analyzer may also determine: $CO_2$, $H_2O$, $SO_2$, $N_2$ and $O_2$. Stack Temp, Oxygen (02)-Carbon Dioxide (C02) levels, Ambient Air Temp, Dew Point temp, Smoke Spot Number, Fuel Pressure, Nitrogen Oxides (NOx).

The pressure sensor is an important element in the heat recover system's 10 efficiency. It is important to have a high-quality pressure sensor that has a quick response time to adequately modulate the exhaust fan 28 speed. A response time under 20 seconds is preferred. Another modulating pressure controller will preferably monitor draft and pressure used with fans and dampers to maintain constant boiler pressure. The systems' goal will be to maintain stack pressure as close as possible to the boiler manufacture's specifications.

Various combinations of three-way valves may be used to blend and divert the various lines: cold water feed, preheated water, heating loops. Isolation valves may be used to isolate components for maintenance and direct the pipe flow direction.

Monitoring the intake temperatures of the exhaust gases at the intake plenum 20 provides a feedback point for controlling the coolant flow rate passing through serpentine conduits 24. The temperature sensors are preferably installed directly in wells for accuracy.

A programmable logic controller ("PLC") 36 processes all the sensors that monitor the heat recovery system 10. The PLC 36 also controls all the valves and other mechanisms that are controllable in the heat recovery system 10. The PLC 36 controls the velocity of the exhaust fan 28 and the motorized valves 34 that control the coolant flowrate through the inlet ports 30 and outlet ports 32.

The PLC 36 may use custom software to control its logic decisions or off-the-shelf smart self-correcting HVAC software from third parties such as Siemens or other developers. The PLC 36 can directly control and adjust fan speed and operation. For example; if high winds create a sudden change in draft pressure or a boiler malfunctioned, the software would instruct the PLC 36 to adjust the exhaust fan 28 and pump speeds accordingly. The PLC 36 is located in a central place on or near the boiler and heating appliances, so it can be viewed for system status. Optionally, users will have no direct access to the heat recovery system 10 settings of the PLC 36. In such embodiments, plug-in ports will be concealed beneath a proprietary case and if the case has been removed, the PLC 36 settings can only be changed by connecting a proprietary cable and then accessing the software with a password. In other embodiments, the PLC 36 may be directly connected to the Internet to allow users to monitor the heat recovery system 10 and building efficiency in real time. In some embodiment, the PLC 36 may be pre-programmed to capture heat from a building's AC compressors. This will obviously be done during the summer or when the air conditioning system is on.

It is preferred that the serpentine conduits 24 are multi-channel condensing coils with heat exchanging fins made from copper and external stainless-steel plate heat exchangers connected by a mix of water and food grade glycol lines. However, other materials may be used and other systems that allow for the transfer of heat from the exhaust gasses to a coolant of some form would work equally well.

Prior art flue gas heat recovery systems tend to be passive, meaning they are typically mounted in-line with the boilers' exhaust. If the heat recovery system fails, the boilers are unable to continue operating. The venting arrangement 16 of the heat recovery system 10 presented herein has a failsafe that is independent of the boilers' existing exhaust paths. Should the heat recovery system 10 fail, the dampers 18 are set to open the flues 12 so that there is no obstruction in the boilers' normal vent path.

If there is a loss of power to the heat recovery system 10, a relay installed on the heat recovery system 10 is set to close the dampers 18 that direct the exhaust gasses to the heat recovery system 10 and open the dampers 18 that divert the exhaust gasses from the flue 12 such that the heating system's 10 existing exhaust flues 12 are unobstructed until the PLC 36 has determined the entire system can re-start normal functions in a safe manner. The heat recovery system 10 preferably operates on single phase 120-volt electrical power. However, depending on the fan and pumps used, an option for two-phase 220-volt electrical power may be utilized to achieve greater efficiency.

The PLC 36 controls the exhaust fan 28 to ensure air flow through the heat recovery system 10 will not pull in too much air into the intake plenum 20, across the serpentine conduits 24. Pulling in too much air can create a cooling effect making the heat recovery less effective. For the heat recovery system 10 to work correctly the heating system 14 must have sufficient incoming air as the exhaust fan 28 will be sucking air out of it. If insufficient air is present a modulating draft system may be needed to maintain constant pressure in the system.

Many boilers may not be operating with sufficient intake air. Before installing the heat recovery system 10, a combustion analysis should be performed on existing boilers. Existing boilers also need to be firing correctly prior to installing the heat recovery system 10. Boilers operate better by drawing in ambient boiler room air rather than cold air from outside.

The exhaust fan 28 is preferably a variable speed fan that collects exhaust gases from multiple atmospheric or power vented boilers in any combination to the venting arrangement 16. These exhaust gasses are channeled to a single intake plenum 20. For systems with multiple boilers, the exhaust gasses are channeled to a common header then to the single intake plenum 20.

The exhaust fan 28 should have as few wires as possible to reduce the chances of melting wires, to provide higher efficacy, and faster response times. The exhaust fan 28 should never overpower the heating system's 14 exhaust draught or flowrate. Creating too much or not enough draw could affect the heating system's 14 proper operation.

The exhaust gas may also be corrosive. The exhaust fan 28 and fan housing/body will need to be resistant to such corrosive exhaust gases. The exhaust fan 28 body will preferably be made from 316L stainless steel or fiberglass. The exhaust fan 28 motor will be enclosed to avoid corrosion. One option will be to have a totally enclosed, variable speed motor mounted outside the air stream. The exhaust fan 28 may be installed horizontally or vertically.

The heart of the heat recovery system 10 is the heat exchanger 22. Depending on the building the heat exchanger 22 may comprise anywhere from two to six or more serpentine conduits 24, depending on the total BTU load of the heating system 14. Additional, external, plate heat exchangers may be used depending on the number of appliances and tasks the heat recovery system 10 in the building. The embodiment shown in the FIG. 1 shows a heat exchanger with two serpentine conduit 24 units. Because the heat recovery system 10 is modular, additional serpentine conduit 24 units with their own inlet ports 30 and outlet ports 32 may be added in particular applications if needed.

Each serpentine conduit 24 unit may be approximately 18 inches wide×18 inches tall×6 rows thick. The actual size, general configuration, number of rows, and fin spacing will vary with the application. The channels and loop configurations used with each serpentine conduit 24 unit will also vary. The first serpentine conduit 24 unit is mounted in the intake plenum 18 where all the boilers' exhaust is first channeled and utilized. Temperatures in this area will average between 270-450° F. This area recovers the "sensible" heat. Most boilers will have exhaust temp of 250° F. (low fire) to 450° $F.$ (high fire). All boilers have relatively fixed exhaust temperatures based on the temperatures they are heating. A boiler that is heating water to 180° F. will typically have an exhaust temp of 50% greater than the target temperature, or 360° F.

This first serpentine conduit 24 unit is preferably a "split" coil made from copper with aluminum fins that are coated and baked with a thermally conductive corrosion resistant coating, such as Heresite®. The fins of the first serpentine conduit 24 unit have preferably relatively larger fin separations than downstream serpentine conduit 24 units to allow better flow of exhaust gasses and reduce the chance of fowling.

Because the first serpentine conduit 24 unit receives the highest heat load from the heating system 14 exhaust gasses, it receives inlet ports 30 from domestic hot water, boiler pre-heat return lines, from heating radiators, and boiler feed water. The outlet ports 32 from the first serpentine conduit 24 units return heated coolant to hot water boilers, air handling systems, etc. to pre-heat make up water or air in those systems thereby reducing the amount of energy required to heat water or air to selected target levels.

The second serpentine conduit 24 unit, mounted to the exhaust plenum 26 area, closest to exhaust fan 28. The exhaust temperature in this area should be below 130° F. This lower temperature allows the heat recovery system 10 to maximize its condensing feature and capture the latent heat in the exhaust gasses. To create the best condensing temperature, the buildings' cold-water feed may be used to pass through one inlet port 30 on this second serpentine conduit 24 unit. This area should also see the most condensate production. Other inlet ports 30 and outlet ports 32 on the second serpentine conduit 24 unit may be bridged to the first serpentine conduit 24 unit or feed other loops like a plate heat exchanger 37 or an air handlers' glycol line. The PLC 36 and any associated valves will be programmed to properly circulate the various flows depending on the demands and line temperatures imposed on the heat recovery system 10.

The second serpentine conduit 24 unit may preferably be a closed loop containing 20% glycol, but other proportions of glycol may be used or other coolants if necessary. If so, such a system could be used to circulate to an outdoor air handler 40 then return to the second serpentine conduit 24 unit to create condensing. Custom size ⅝"-diameter or other diameter aluminum fin copper tube coils can be made to fit the air handler 40 intake area. The heat recovery system 10 may use this custom coil to pre-heat/pre-cool coil the building's make up air. If using the coil to pre-cool, the extra benefit will be the added humidification to the building's air supply. Insulated and non-insulated lines may be installed between the heat recovery system 10 and the coil at the air-handler.

The use and number of serpentine conduit 24 units, intake ports 30, and outlet ports 32 in any particular heat recovery system 10 will vary depending on the actual building setup, available BTU's from the building heating system 14, and temperature requirements. One optional way to further increase the heat recovery process within the heat recovery system 10 would be to add specific and varied size fins in front of or between sections of the serpentine conduit 24 units thus creating asymmetric turbulence and increasing the heat recovery potential.

Fins spacing in the serpentine conduit 24 units should be fairly wide to resist fouling and facilitate cleaning. A spacing of 8-10 fins per inch is preferred but other spacings would work that balance thermal transfer against the possible collection of debris against the fins. If temperature sensor registers an exhaust gas temperature rising above 450° F., the sensor will signal the PLC 36 to continue circulating coolant through the serpentine conduit 24 units. If this fails to adequately reduce the exhaust gas temperature, a pressure relief valve may also be incorporated into the system. Such a condition not mean that the serpentine conduit 24 unit will ever reach 450° F., especially if coolant is flowing through it.

Coolant flow through each serpentine conduit 24 unit is also important. If coolant isn't flowing, the serpentine conduit 24 unit will overheat and/or evaporate coolant within itself. The PLC 36 will close its redirect the motorized dampers 18 to avoid this from happening.

Some heating systems 14 emit substantial heat while they are in standby mode. The PLC 36 may open the motorized dampers 18 slightly and possibly activate the exhaust fan 28 at low speeds. This will allow a constant flow of warm heat to keep the serpentine conduit 24 units warm even when the heating systems 14 are not fully firing.

Strategically placed, custom HVAC heat transfer coils 38, specific to the existing HVAC systems are mounted to the air handler's 40 intake to help pre-heat the buildings make up air. These outdoor coils are directly connected to the heat recovery system 10 inside the building by a series of insulated and un-insulated pipes.

The air-handler 40 option has dual operating purposes depending on the season and outdoor temperature. In the cooler months the outdoor air handler 40 coil and uninsulated return lines help circulate cool temperature glycol-water mix to the heat recovery system's 10 first serpentine conduit. This cooler temperature less then 130° F. helps create condensing, which in turn helps capture latent heat. In summer the warm, outdoor portion of the air-handler's 40 glycol loop is cooled by HVAC heat transfer coils 38 that is connected to a plate heat exchanger 37 which circulates its glycol-water mix, beside cool ground water feed to its air handler intake coil arrangement. This provides passive sustainable, cooling and humidification to the air handlers.

The split coil, multi-channel design allows feed from domestic water or circulating glycol loop from exterior air handler, whichever is colder or currently circulating, to provide condensing temperatures which help capture the latent heat. When the domestic water feed is not available or flowing the system of coils and valves utilize the circulating loop from the exterior air handler.

The heat recovery system captures exhaust heat from atmospheric, fan assisted, or forced air boilers. The return water line temperatures in apartment buildings are always above 140° F., so condensing cannot take place. In such systems, the heat recovery system 10 uses the cold-water feed and the outdoor return air handler line to create temperatures well below 140° F. and therefore provides a condensing option for non-condensing boilers.

The main internal FGR heat recovery coils are made from copper, making them 20 times more conductive than stainless steel. The copper coils are coated with a with a thermally conductive corrosion resistant coating, such as Heresite®, to avoid/resist corrosion. Removable cover plates allow the serpentine conduit 24 units to be easily slide in and out for service if needed.

Condensate is channeled to condensate collection system that includes a condensate collection reservoir 41 where it is possible to neutralize acidity in the system if the condensate is corrosive. A pH alarm in the reservoir tank would signal when additional chemical treatment is needed to adjust the pH. Water can then be reused as needed. Recovered and neutralized condensate may be used as greywater top-up to boiler room appliances that require make-up water. Recovering the condensate will improve the building efficiency, lower make-up water cost, and reduce sewer system disposal fees. Condensate should be captured and measured from first and second serpentine conduit 24 units separately. If there is a substantial enough flow, the condensate collection system could also include a reservoir tank and a condensate pump with a filter system that may be used to replenish or top-up the appropriate water feeds to the heating system 14.

An optional cleaning system (not shown) may be added to the heat recovery system 10 that comprises adding a spray nozzle or series of spray nozzles in the heat exchanger 22. These spray nozzles would provide a cleaning cycle that could periodically spray water or other cleaning product on the serpentine coils 24 to keep the internal surface components of the heat recovery system 10 clean.

The heat recovery system 10 is designed to increase the overall efficiency of most boiler rooms. This also reduces the amount of time each boiler is on. Most boiler rooms have a central interface control which cycles the boilers on and off to balance their collective operating time. In the absence of this central interface the PLC 36 of the heat recovery system 10 could be used to offer a boiler sequencing feature. This will benefit the longevity of the boilers. Some of the heat recovery system's 10 components like the pressure sensors, exhaust fans 28, pumps, damper motors, and the PLC 36 may be interlocked with the heating system's 14 controls.

The heat recovery system 10 is specifically designed for residential, mid- to high-rise, multi-unit, apartment buildings. The heat recovery system 10 modular components can be easily transported in standard elevators and doorways. Minimal engineering and work required to install this system. It may be ceiling or floor mounted. It is also small enough to be moved with a hand dolly and is sized to fit through standard doorways.

Most custom coils manufacturers have approvals from the Technical Standards & Safety Authority (TSSA), UL, and/or other approvals. It is understood that certain locations may need field approvals by specific governing agencies. This will be dependent on how much of the boiler venting system is altered.

Figure 2:
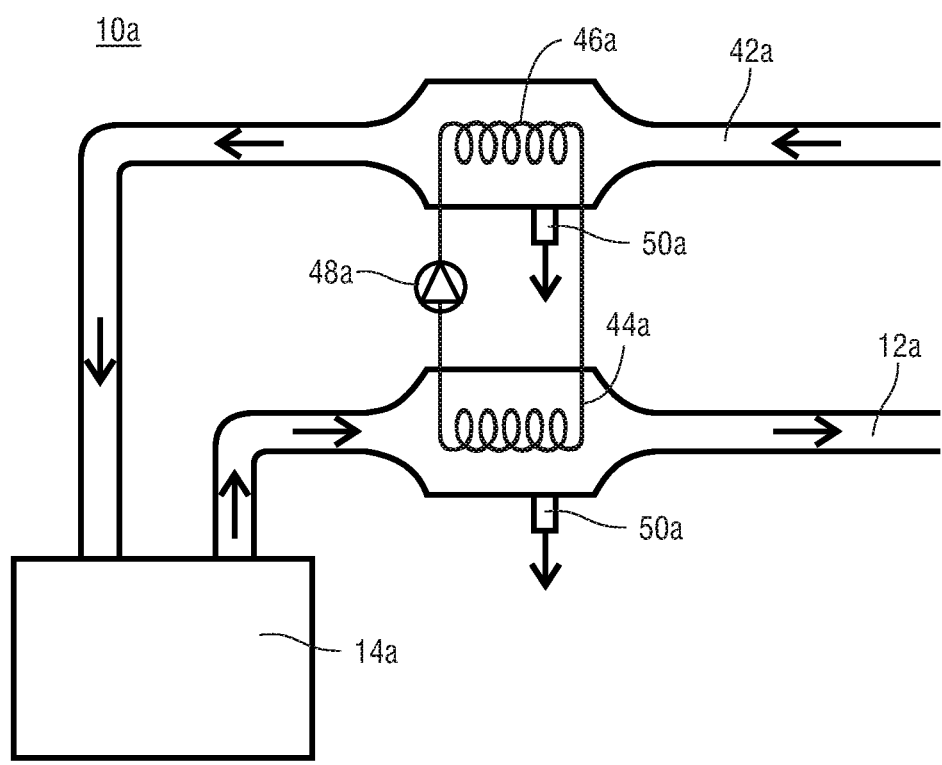
FIG. 2 shows a schematic of a flue gas energy recovery system connected to an air handling system.

FIG. 2 shows a simplified heat recovery system 10a for recovering waste heat from exhaust gases that are expelled through an exhaust flue 12a that are generated as a byproduct from a heating system 14a for preheating intake gases in an intake flue 42a to the heating system 14a. A first heat exchanger 44a is located in the exhaust flue 12a. A second heat exchanger 46a is located in the intake flue 42a. The first heat exchanger 44a and the second heat exchanger 46a are connected to each other. A coolant is maintained within the heat exchangers. A pump 48a propels the coolant from the first heat exchanger 44a to the second heat exchanger 46a such that the coolant is heated in the exhaust flue 12a and cooled in the intake flue 42a to recover heat in the exhaust gases and preheat the intake gases. This means that the gases enter the heating system 10a warmer than they would normally would and the heating system 10a requires less fuel to heat the intake gases. Condensate drains 50a may be incorporated to remove condensation from the system as needed.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. A heat recovery system for recovering waste heat from exhaust gases that are expelled through flues that are generated as a byproduct from heating systems, comprising: a venting arrangement connected to the flues from any number of multiple heating systems; a motorized damper within each flue configured to direct the exhaust gases from each flue to optionally bypass the flues from the heating systems through said venting arrangement to an intake plenum; said intake plenum configured to direct the exhaust gases to a heat exchanger, said heat exchanger comprising a series of serpentine conduits between which the exhaust gases pass through; said heat exchanger is configured to connect to an exhaust plenum which is in turn configured to connect to an exhaust fan that draws the exhaust gases through the heat recovery system; said heat exchanger further comprising a series of inlet ports and outlet ports; said inlet ports located and configured to add coolant to said serpentine conduits at selected temperatures; said outlet ports located and configured to remove coolant from said serpentine conduits at selected temperatures; and a temperature sensor at each said inlet port and each said outlet port; and a PLC for operational control of each said motorized damper, each said insert port, each said outlet port, wherein said PLC: controls the position of each motorized damper; ensures proper isolation and sealing of inactive heating systems to maintain exhaust pressure and prevent improper venting in the heat recovery system; and selectively modulates heat recovery operations based on system conditions to optimize energy efficiency and operational safety of the heat recovery system.

2. The heat recovery system of claim 1 further comprising said PLC configured to control the velocity of said exhaust fan.

3. The heat recovery system of claim 1 further comprising a series of motorized valves configured to control coolant flowrate through said inlet ports and said outlet ports thereby controlling coolant flowrate through said serpentine conduits.

4. The heat recovery system of claim 1 further comprising;
a series of motorized valves configured to control coolant flowrate through said inlet ports and said outlet ports thereby controlling coolant flowrate through said serpentine conduits; and
said PLC configured to control said motorized valves.

5. The heat recovery system of claim 1 wherein said outlet ports are configured to return heated coolant to said heating system for reheating, distribution, or storage.

6. The heat recovery system of claim 1 in which said exhaust fan is a variable speed fan.

7. The heat recovery system of claim 1 in which elements of said heat exchanger that are subject to corrosion are coated with a thermally conductive corrosion resistant coating.

8. The heat recovery system of claim 1 in which said serpentine conduit comprises one of fin tube type heat exchangers, plate heat exchangers, condenser heat exchangers, or a combination thereof.

9. The heat recovery system of claim 1 in which said coolant to and from said inlet ports and/or said outlet ports are used to preheat or precool air in air conditioning and ventilation systems and/or water in water heating systems.

10. The heat recovery system of claim 1 in which the coolant to one of said inlet ports comprises domestic cold water.

11. The heat recovery system of claim 1 in which the coolant to one of said inlet ports comprises outdoor ambient air for heating or cooling as needed.

12. The heat recovery system of claim 1 further comprising a modulating pressure controller configured to monitor and regulate draft and pressure within said exhaust fan and said motorized damper.

13. The heat recovery system of claim 1 further comprising condensate collection systems configured to capture condensate created within the heat recovery system for recycling or removal.

14. The heat recovery system of claim 1 further comprising a flue gas analyzer configured to measure the physical characteristics and content of the exhaust gases entering and/or leaving the heat recovery system.

15. A heat recovery system for recovering the heat from exhaust gases that are expelled through flues that are generated as a byproduct from compressor driven cooling systems comprising: a venting arrangement connected to the flues from any number of multiple cooling systems; a motorized damper within each flue configured to direct the exhaust gases from each flue to optionally bypass the flues from the cooling systems through said venting arrangement to an intake plenum; said intake plenum configured to direct the exhaust gases to a heat exchanger, said intake plenum comprising a series of serpentine conduits between which the exhaust gases pass through; said heat exchanger is configured to connect to an exhaust plenum, said exhaust plenum configured to connect to an exhaust fan that draws the exhaust gasses through the heat recovery system; said heat exchanger further comprising a series of inlet ports and outlet ports; said inlet ports located and configured to add coolant to said serpentine conduits at selected temperatures; said outlet ports located and configured to remove coolant from said serpentine conduits at selected temperatures; and a temperature sensor at each said inlet port and each said outlet port; and a PLC for operational control of each said motorized damper, each said insert port, each said outlet port, wherein said PLC: controls the position of each motorized damper; ensures proper isolation and sealing of inactive heating systems to maintain exhaust pressure and prevent improper venting in the heat recovery system; and selectively modulates heat recovery operations based on system conditions to optimize energy efficiency and operational safety of the heat recovery system.

16. The heat recovery system of claim 15 further comprising said PLC configured to control the velocity of said exhaust fan.

17. The heat recovery system of claim 15 further comprising a series of motorized valves configured to control coolant flowrate through said inlet ports and said outlet ports thereby controlling coolant flowrate through said serpentine conduits.

18. The heat recovery system of claim 15 further comprising;
a series of motorized valves configured to control coolant flowrate through said inlet ports and said outlet ports thereby controlling coolant flowrate through said serpentine conduits; and
said PLC configured to control said motorized valves.

19. The heat recovery system of claim 15 wherein said outlet ports return heated coolant to a water heating system.

20. The heat recovery system of claim 15 in which said exhaust fan is a variable speed fan.

21. The heat recovery system of claim 15 in which elements of said heat exchanger that are subject to corrosion are coated with a thermally conductive corrosion resistant coating.

22. The heat recovery system of claim 15 in which said serpentine conduit comprises one of fin tube type heat exchangers, plate heat exchangers, condenser heat exchangers, or a combination thereof.

23. The heat recovery system of claim 15 in which said coolant to and from said inlet ports and/or said outlet ports are used to preheat or precool air in air conditioning and ventilation systems and/or water in water heating systems.

24. The heat recovery system of claim 15 in which the coolant to one of said inlet ports comprises domestic cold water.

25. The heat recovery system of claim 15 in which the coolant to one of said inlet ports comprises outdoor ambient air for heating or cooling as needed.

26. The heat recovery system of claim 15 further comprising a modulating pressure controller configured to monitor and regulate draft and pressure within said exhaust fan and said motorized damper.

27. The heat recovery system of claim 15 further comprising condensate collection systems configured to capture condensate created within the heat recovery system for recycling or removal.

28. The heat recovery system of claim 15 further comprising a flue gas analyzer configured to measure the physical characteristics and content of the exhaust gases entering and/or leaving the heat recovery system.

29. The heat recovery system of claim 1 further comprising heat recovered by at least one of said serpentine conduits is used for preheating intake gases in an intake flue to the heating system.

30. The heat recovery system of claim 1 further comprising said motorized damper is activated to direct exhaust gases from each flue to bypass the flue from the heating system and deactivation of said motorized damper permits exhaust gases to move through the flues unimpeded.

31. The heat recovery system of claim 15 further comprising said motorized damper is activated to direct exhaust gases from each flue to bypass the flue from the heating system and deactivation of said motorized damper permits exhaust gases to move through the flues unimpeded.

* * * * *